(12) United States Patent
Yang et al.

(10) Patent No.: US 9,455,597 B2
(45) Date of Patent: Sep. 27, 2016

(54) ELECTRONIC DEVICE PROTECTIVE CASE

(71) Applicants: BOE TECHNOLOGY GROUP CO., LTD., Beijing (CN); BEIJING BOE ENERGY TECHNOLOGY CO., LTD., Beijing (CN)

(72) Inventors: Peihuan Yang, Beijing (CN); Jingwei Liu, Beijing (CN); Xingbin Song, Beijing (CN); Xiaoyan Han, Beijing (CN)

(73) Assignees: BOE TECHNOLOGY GROUP CO., LTD. (CN); BEIJING BOE ENERGY TECHNOLOGY CO., LTD. (CN)

(*) Notice: Subject to any disclaimer, the term of this patent is extended or adjusted under 35 U.S.C. 154(b) by 0 days.

(21) Appl. No.: 14/427,118

(22) PCT Filed: May 19, 2014

(86) PCT No.: PCT/CN2014/077760
§ 371 (c)(1),
(2) Date: Mar. 10, 2015

(87) PCT Pub. No.: WO2015/103833
PCT Pub. Date: Jul. 16, 2015

(65) Prior Publication Data
US 2016/0036267 A1    Feb. 4, 2016

(30) Foreign Application Priority Data

Jan. 9, 2014   (CN) .......................... 2014 1 0010246

(51) Int. Cl.
*H02J 7/35*        (2006.01)
*H02J 7/00*        (2006.01)

(52) U.S. Cl.
CPC .............. *H02J 7/355* (2013.01); *H02J 7/0044* (2013.01); *H02J 7/0047* (2013.01); *H02J 7/0054* (2013.01); *H02J 7/35* (2013.01); *Y02E 10/566* (2013.01)

(58) Field of Classification Search
CPC ....................................................... H02J 7/355
USPC ......................................................... 320/101
See application file for complete search history.

(56) References Cited

U.S. PATENT DOCUMENTS

| | | | |
|---|---|---|---|
| 2009/0284216 A1* | 11/2009 | Bessa .................... | H02J 7/0044 320/101 |
| 2010/0184382 A1* | 7/2010 | Inha ....................... | H02J 7/0052 455/66.1 |

(Continued)

FOREIGN PATENT DOCUMENTS

| | | |
|---|---|---|
| CN | 200973118 | 11/2007 |
| CN | 101904614 | 12/2010 |

(Continued)

OTHER PUBLICATIONS

Notification of the First Office Action issued in corresponding Chinese Application No. 2014100102467 dated May 13, 2015.

(Continued)

*Primary Examiner* — Richard Isla Rodas
*Assistant Examiner* — Dung V Bui
(74) *Attorney, Agent, or Firm* — Baker Hostetler LLP

(57) ABSTRACT

The present disclosure provides an electronic device protective case which is able to, by means of photovoltaic power generation, alleviate the insufficient capacity of a cell for an electronic device when it is used in the open air, and while an accumulator may be used as a power tank. A charging/discharging controller is used to control a photovoltaic cell panel in the protective case to store electric energy after the photovoltaic conversion in an accumulator, with the electric energy in the accumulator used to charge the electronic device. In addition, electrical connection states between an external data line port and the electronic device protective case as well as a port of an electronic device is controlled by means of a switch assembly, and when the switch assembly is in an ON state, the charging/discharging controller is used to control the accumulator or an external data line port to charge the electronic device.

15 Claims, 8 Drawing Sheets

(56) References Cited

U.S. PATENT DOCUMENTS

| | | | | |
|---|---|---|---|---|
| 2011/0220176 | A1* | 9/2011 | Halpern | F24J 2/36 136/246 |
| 2012/0092245 | A1* | 4/2012 | Griffin | G06F 1/1677 345/156 |
| 2013/0106353 | A1* | 5/2013 | Foster | H02J 7/0044 320/114 |
| 2013/0214721 | A1* | 8/2013 | Zhou | H02J 7/35 320/101 |
| 2014/0028242 | A1* | 1/2014 | Akin | H02J 7/35 320/101 |
| 2016/0036267 | A1* | 2/2016 | Yang | H02J 7/0044 320/101 |

FOREIGN PATENT DOCUMENTS

| | | |
|---|---|---|
| CN | 203152791 | 8/2013 |
| CN | 203219358 | 9/2013 |
| CN | 103762636 | 4/2014 |
| EP | 2653053 | 10/2013 |
| JP | 2004336995 | 11/2004 |

OTHER PUBLICATIONS

International Search Report and Written Opinion issued in corresponding International Application No. PCT/CN2014/077760 dated Oct. 15, 2014.

\* cited by examiner

ELECTRONIC DEVICE PROTECTIVE CASE

CROSS-REFERENCE TO RELATED APPLICATION

The present application is the U.S. national phase of PCT Application No. PCT/CN2014/077760 filed on May 19,2014, which claim priority to the Chinese application No. 201410010246.7 filed on Jan. 9,2014,the entire contents of which are incorporated herein by reference.

TECHNICAL FIELD

The present disclosure relates to the field of solar energy application technology, in particular to an electronic device protective case.

BACKGROUND

Mobile phones, as a modern communication tool, have been widely used. As smart mobile phones become more powerful, their usage rate and time have been remarkably increased. A capacity of a mobile phone cell is an important parameter of mobile phone properties. Currently, most of the mobile phone cells can be reused by charging, but when a user goes out or stays in the wild, it is impossible to charge the mobile phone cell due to the lack of a charger. At this time, a traditional method for charging the cell cannot meet the user's requirements.

In order to overcome this drawback, a solar mobile phone case has been presented currently. A solar charging cell is provided within the mobile phone case and electrically connected to a mobile phone charging circuit. When sunlight is irradiated on the solar charging cell, the solar energy will be converted into electric energy by means of photovoltaic conversion, so as to provide the mobile phone with the desired electric energy. During the implementation, the inventor finds that there at least exist the following problems in a traditional technology. During the actual application of the mobile phone case, because the solar charging cell is directly connected to the mobile phone charging circuit, such a phenomenon as overcharge or backflow will occur when the mobile phone cell is charged with the solar charging cell, and the mobile phone cell will be somewhat damaged. In addition, this mobile phone case can operate only when there is the sunlight or adequate sunlight, so the use thereof is limited.

SUMMARY

An object of the present disclosure is to provide an electronic device protective case, so as to prevent the occurrence of overcharge or backflow in an existing solar electronic device protective case and to overcome limitations in use.

The present disclosure provides in one embodiment an electronic device protective case, including a photovoltaic cell panel, an accumulator, a charging/discharging controller, a data port capable of being electrically connected to a port of an electronic device and an external data line port, and a switch assembly capable of controlling electrical connection states of the charging/discharging controller and the data port. The photovoltaic cell panel is electrically connected to the accumulator via the charging/discharging controller, and charges the accumulator under the control of the charging/discharging controller by turning the switch assembly on or off.

According to the above-mentioned electronic device protective case, it is able to, by means of photovoltaic power generation, alleviate the insufficient capacity of the cell for the electronic device when it is used in the open air, and meanwhile the accumulator may be used as a power tank so as to store a certain quantity of electricity for the electronic device. The charging/discharging controller is used to control the photovoltaic cell panel to store electric energy after the photovoltaic conversion in the accumulator, and the electric energy in the accumulator is used to charge the electronic device, so it is able to prevent the occurrence of possible overcharge or backflow in the prior art when the electronic device is directly charged with the photovoltaic cell panel. In addition, it is still able to charge the electronic device even when no sunlight is irradiated on the photovoltaic cell panel, thereby to overcome the limitations in use.

In one possible embodiment, the switch assembly is configured to, in an OFF state, control the charging/discharging controller to be disconnected from the data port and control the external data line port to be directly electrically connected to the data port, and in an ON state, control the charging/discharging controller to be electrically connected to the data port and control the external data line port to be electrically connected to the data port via the charging/discharging controller. The charging/discharging controller is configured to control the accumulator or the external data line port to charge the electronic device, or control the external data line port to charge the accumulator.

According to the above-mentioned electronic device protective case in this embodiment, an electrical connection state between an external data line and the electronic device protective case as well as the port of the electronic device is controlled by means of the switch assembly, and when the switch assembly is in the ON state, the charging/discharging controller is used to control the accumulator or the external data line to charge the electronic device. As a result, it is able to switch charging modes for the electronic device on different occasions, thereby to facilitate a user.

In one possible embodiment, the case further includes a rear shell for accommodating the electronic device and a front cover for covering the electronic device, the photovoltaic cell panel is built in an outer surface of the front cover, and the accumulator is built in the rear shell.

In one possible embodiment, the front cover can be rotatably mounted, about one of its side edges, on the rear shell.

In one possible embodiment, a slot for placing the charging/discharging controller is provided inside the rear shell.

In one possible embodiment, the case further includes a clock control circuit electrically connected to the charging/discharging controller, and a time display panel electrically connected to the clock control circuit.

In one possible embodiment, the time display panel consists of light-emitting diode digital tubes arranged in an array form.

In one possible embodiment, the case further includes a charging/discharging state display circuit electrically connected to the charging/discharging controller, and a charging/discharging state indicator electrically connected to the charging/discharging state display circuit.

In one possible embodiment, the charging/discharging state indicator includes a photovoltaic charge indicator configured to be turned on when the accumulator is being charged with the photovoltaic cell panel, an electronic device charge indicator configured to be turned on when the electronic device is being charged, and a municipal electricity indicator configured to be turned on when the external data line port is operating.

In one possible embodiment, the case further includes an accumulator electricity quantity display circuit electrically connected to the charging/discharging controller, and an electricity quantity display panel electrically connected to the accumulator electricity quantity display circuit.

In one possible embodiment, the case further includes a caller ID display control circuit electrically connected to the charging/discharging controller and a caller ID display indicator electrically connected to the caller ID display control circuit.

DETAILED DESCRIPTION

The present disclosure will be described hereinafter in conjunction with the drawings and the embodiments.

Figure 7:
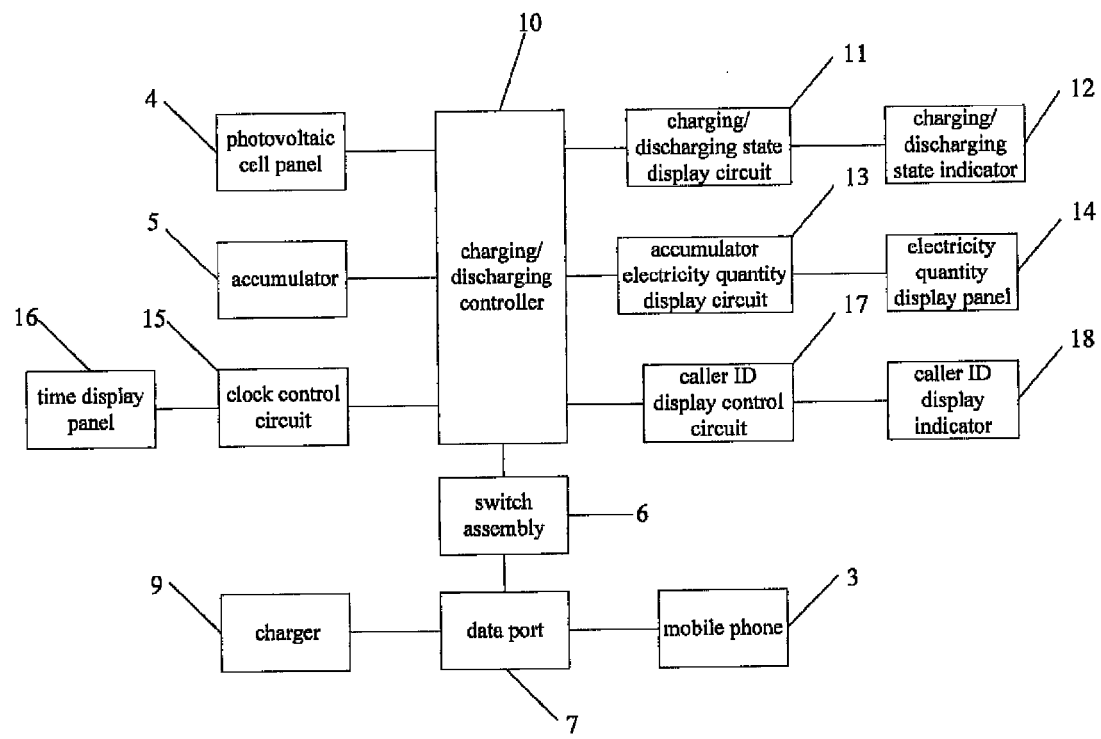
FIG. 7 is a schematic view showing a connection relationship among members of the electronic device protective case according to one embodiment of the present disclosure.

It should be appreciated that, sizes and shapes of respective members in the drawings are for illustrative purposes only, but shall not be used to reflect an actual scale. Here, a mobile phone is taken as an example of an electronic device (e.g., as shown in FIG. 7).

The present disclosure provides in one embodiment an electronic device protective case including a housing with a slot for accommodating an electronic device. It further includes in the housing a photovoltaic cell panel, an accumulator, a charging/discharging controller, a switch assembly, and a data port capable of being electrically connected to a port of an electronic device and an external data line port.

The photovoltaic cell panel is electrically connected to the accumulator via the charging/discharging controller so as to charge the accumulator under the control of the charging/discharging controller.

The switch assembly is configured to, in an OFF state, control the charging/discharging controller to be disconnected from the data port and control an external data line to be directly electrically connected to the data port, and in an ON state, control the charging/discharging controller to be electrically connected to the data port and control the external data line port to be electrically connected to the data port via the charging/discharging controller. The charging/discharging controller is configured to control the accumulator or the external data line port to charge the electronic device, or control the external data line port to charge the accumulator.

According to the above-mentioned electronic device protective case, it is able to, by means of photovoltaic power generation, alleviate the insufficient capacity of the cell for the electronic device when it is used in the open air, and meanwhile the accumulator may be used as a power tank so as to store a certain quantity of electricity for the electronic device. The charging/discharging controller is used to control the photovoltaic cell panel to store electric energy after the photovoltaic conversion in the accumulator, and the electric energy in the accumulator is used to charge the electronic device, so it is able to prevent the occurrence of possible overcharge or backflow in the prior art when the electronic device is directly charged with the photovoltaic cell panel. In addition, it is still able to charge the electronic device even when no sunlight is irradiated on the photovoltaic cell panel, thereby to overcome the limitations in use. In addition, electrical connection states between an external data line port and the electronic device protective case as well as the port of the electronic device are controlled by means of the switch assembly, and when the switch assembly is in the ON state, the charging/discharging controller is used to control the accumulator or the external data line port to charge the electronic device. As a result, it is able to switch charging modes for the electronic device on different occasions, thereby to facilitate a user.

During the implementation, the electronic device protective case in this embodiment may be a mobile phone case, a flat panel PC case, or a case for any other electronic device, which is not particularly defined herein.

Respective members of the electronic device protective case in this embodiment will be described hereinafter in details.

Figure 1:
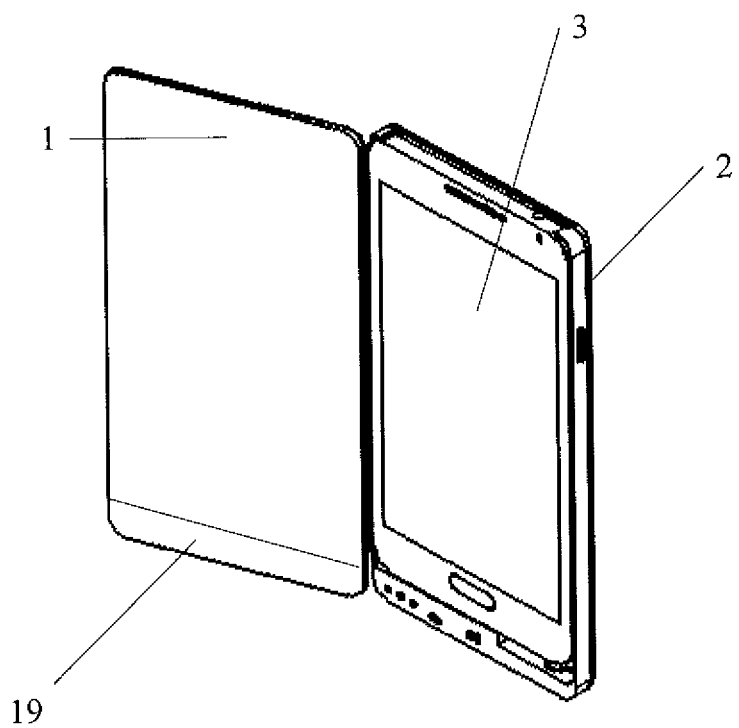
FIG. 1 is a solid view of an electronic device protective case according to one embodiment of the present disclosure.
Figure 2:
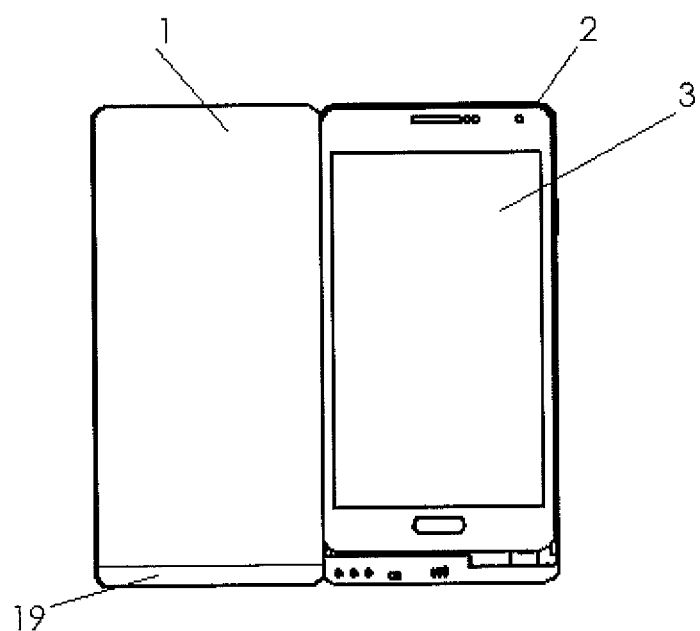
FIG. 2 is a front view of the electronic device protective case according to one embodiment of the present disclosure.
Figure 3:
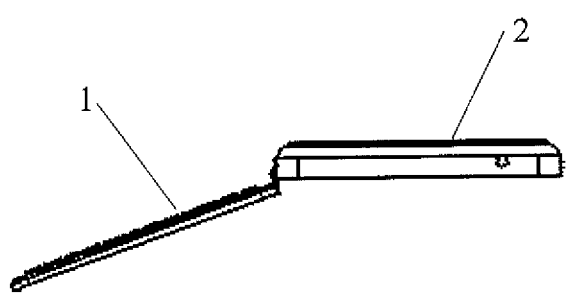
FIG. 3 is a top view of the electronic device protective case according to one embodiment of the present disclosure.
Figure 4:
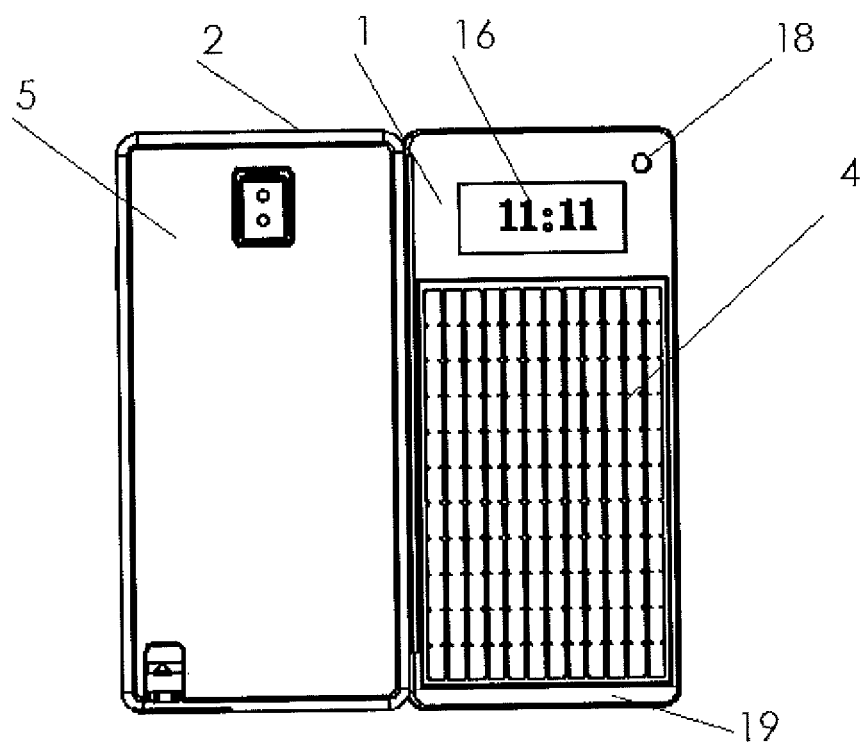
FIG. 4 is a back view of the electronic device protective case according to one embodiment of the present disclosure.

During the implementation, in order to protect the electronic device in a better manner and prevent the electronic device from being damaged by sun exposure when the photovoltaic conversion is carried out by the photovoltaic cell panel, the electronic device protective case in this embodiment may be of a flip type, as shown in FIGS. 1-3. In other words, the housing specifically includes a front cover 1 and a rear shell 2, and the electronic device 3 may be placed in the accommodation slot of the rear shell 2. In addition, as shown in FIG. 4, the photovoltaic cell panel 4 may be built in a surface of the front cover 1, the accumulator 5 may be built in the rear shell 2, and vice versa. Of course, the photovoltaic cell panel and the accumulator may be both built in the front cover or the rear shell, which is not particularly defined herein.

When the photovoltaic cell panel 4 is built in an outer surface of the front cover 1, it will be irradiated by the sunlight as long as the front cover 1 is closed. Further, the front cover 1 may prevent the electronic device from being directly exposed to the sunlight, so as to protect the electronic device. In one illustrative example, the photovoltaic cell panel 4 and the accumulator 5 may be arranged in the front cover 1 and the rear shell 2, respectively. An ultrathin accumulator 5 may be used, so as to control a thickness of the entire electronic device protective case, thereby to provide a light and thin electronic device protective case.

Further, as shown in FIGS. 1-4, the front cover 1 of the above-mentioned electronic device protective case may be, about one of its side edges, rotatably mounted on the rear shell 2, so as to enable the front cover 1 to rotate within a range of 0° to 360°, thereby to facilitate the use of the electronic device. Of course, the front cover 1 may also be connected to the rear shell 2 in any other ways, which are not particularly defined herein.

Figure 5:
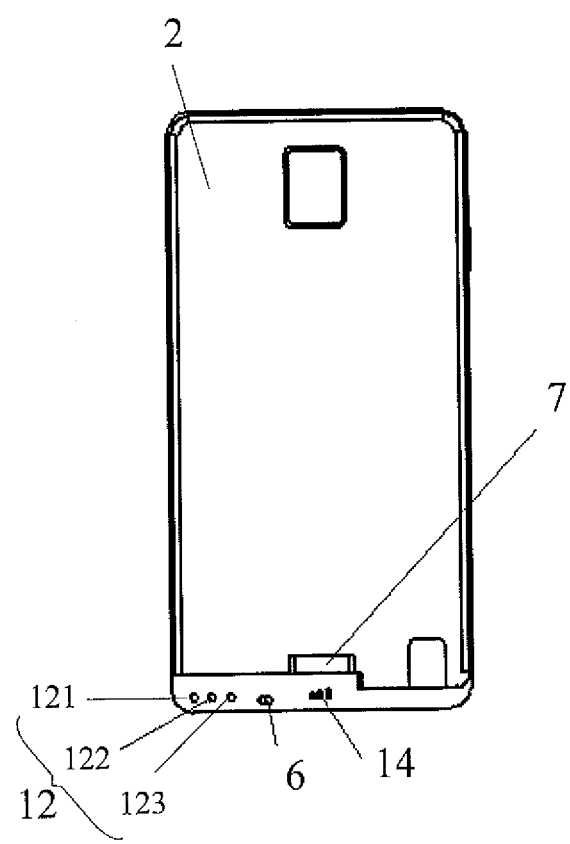
FIG. 5 is a front view of a rear shell of the electronic device protective case according to one embodiment of the present disclosure.
Figure 6:
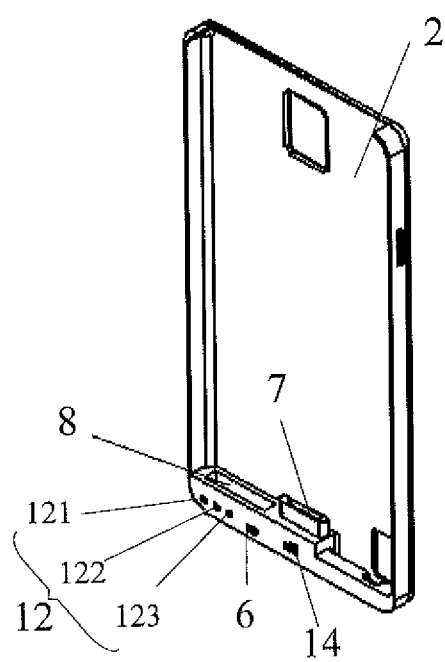
FIG. 6 is a solid view of the rear shell of the electronic device protective case according to one embodiment of the present disclosure.

Alternatively, in order to provide the entire electronic device protective case with a beautiful appearance, as shown in FIG. 5, the switch assembly 6 and the data port 7 may be both arranged on the rear shell 2. Alternatively, as shown in FIG. 6, a slot 8 for placing the charging/discharging controller may also be arranged inside the rear shell 2, and the charging/discharging controller, which serves as a circuit element, may be mounted within the slot 8.

To be specific, referring to FIGS. 7 and 8, which show connection relationships between the electronic device protective case and a charger 9 connected to the external data line port as well as the electronic device 3, functions of the data port 7, the switch assembly 6 and the charging/discharging controller 10 will be described as follows.

The data port 7 functions as to be connected to the port of the electronic device, so as to transmit data and charge the electronic device. In addition, an outer end of the data port 7 may also be connected to the external data line port to serve as an extension of the port of the electronic device.

The switch assembly 6 functions as to control a connection state of the data port 7 and the charging/discharging controller 10, thereby to control a connection state of the electronic device protective case and the electronic device 3. In addition, the switch assembly 6 may further be configured to control a connection state of the charging/discharging controller 10 and the external data line port. When the switch assembly 6 is in an ON state, the charging/discharging controller 10 is connected to the data port 7, and if at this time the data port 7 is connected to the external data line port, the external data line port will be directly connected to the port of the electronic device via the data port 7, so as to charge the electronic device 3 and transmit the data thereto normally. When the switch assembly 6 is in an OFF state, the charging/discharging controller 10 is disconnected from the data port 7, and if at this time the data port 7 is connected to the external data line port, and the charger 9 connected to the external data line port will be connected to the port of the electronic device via the charging/discharging controller 10.

The charging/discharging controller 10 functions in two ways. On one hand, it will detect a photovoltaic conversion condition of the photovoltaic cell panel 4 and an electricity quantity of the accumulator 5. When the accumulator 5 is of insufficient electricity quantity and there exists the photovoltaic conversion in the photovoltaic cell panel 4, the charging/discharging controller 10 will control the photovoltaic cell panel 4 to charge the accumulator 5. On the other hand, when it is detected that the charging/discharging controller 10 is connected to the electronic device 3 but not to the external data line port, it will control the accumulator 5 to charge the electronic device 3, and when it is detected that the charging/discharging controller 10 is connected to the electronic device 3 and the external data line port, it will preferentially control the external data line port to charge the electronic device 3, and control the charger 9 connected to the external data line port to charge the accumulator 5 after the charging of the electronic device 3 is completed.

Alternatively, in order to enable the user to acquire a current usage state of the electronic device protective case, as shown in FIG. 7, the electronic device protective case in this embodiment further includes a charging/discharging state display circuit 11 electrically connected to the charging/discharging controller 10, and a charging/discharging state indicator 12 electrically connected to the charging/discharging state display circuit 11. The charging/discharging controller 10 may, according to the current usage state of the electronic device protective case, send a corresponding electric signal to the charging/discharging state display circuit 11, and the charging/discharging state display circuit 11 may control the corresponding charging/discharging state indicator 12 to be turned on according to the received electric signal.

During the implementation, in order to provide the entire electronic device protective case with a beautiful appearance, as shown in FIGS. 5 and 6, the charging/discharging state indicator 12 may be arranged at a lower part of the rear shell 12. In order to prevent the front cover 1 from sheltering the charging/discharging state indicator 12, as shown in FIGS. 1, 2 and 4, a transparent window 19 may be arranged on the front cover 1 at a region corresponding to the charging/discharging state indicator 12, so that the user can see the charging/discharging state indicator 12 without opening the front cover 1. During the implementation, the charging/discharging state indicator 12 may also be arranged at a bottom surface of the rear shell, or at any other positions, which are not particularly defined herein.

In one illustrative example, the charging/discharging state indicator 12 may be controlled so as to display different colors for different charging/discharging states. Alternatively, as also shown in FIGS. 5 and 6, a plurality of charging/discharging state indicators 12 may be provided, and each charging/discharging state indicator 12 corresponds to one state. For example, as shown in FIG. 8, the charging/discharging state indicators 12 may include: a photovoltaic charge indicator 121 configured to be turned on when the accumulator is being charged with the photovoltaic cell panel; an electronic device charge indicator 122 configured to be turned on when the electronic device is being charged; and a municipal electricity indicator 123 configured to be turned on when the external data line port is operating.

Figure 8:
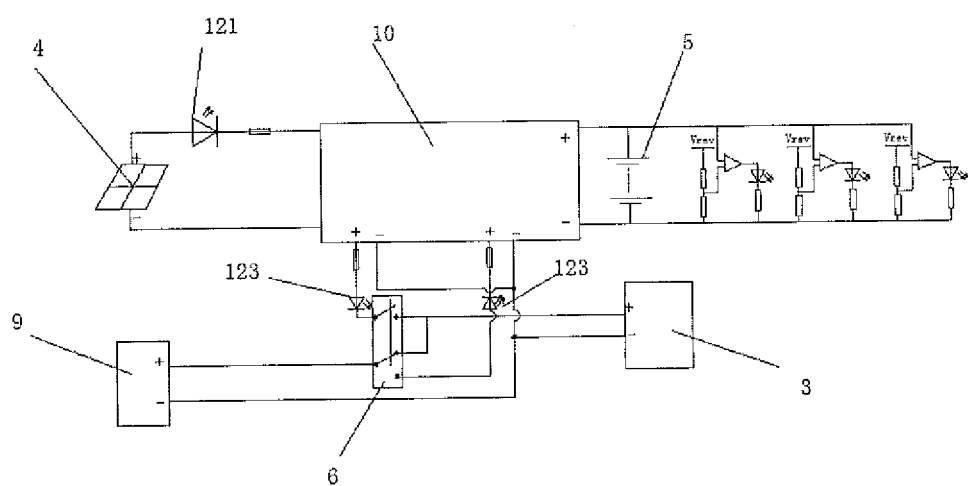
FIG. 8 is a circuit diagram of the electronic device protective case according to one embodiment of the present disclosure.

As shown in FIG. 8, the photovoltaic charge indicator 121 is usually connected serially between the photovoltaic cell panel 4 and the charging/discharging controller 10. The electronic device charge indicator 122 is usually connected serially between the charging/discharging controller 10 and the switch assembly 6, and turned on when the electronic device 3 is charged with the external data line port or the accumulator 5. The municipal electricity indicator 123 is usually connected serially between the charger 9 and the charging/discharging controller 10, and turned on when the electronic device 3 or the accumulator 5 is charged with the charger 9 connected to the external data line port.

Alternatively, in order to enable the user to acquire an electricity quantity state of the accumulator 5 in the electronic device protective case, as shown in FIG. 7, the above-mentioned electronic device protective case may further include an accumulator electricity quantity display circuit 13 electrically connected to the charging/discharging controller 10, and an electricity quantity display panel 14 electrically connected to the accumulator electricity quantity display circuit. The charging/discharging controller 10 may send a corresponding electric signal to the accumulator electricity quantity display circuit 13 in accordance with a current electricity quantity state of the accumulator in the electronic device protective case, and the accumulator electricity quantity display circuit 13 may control the electricity quantity display panel 14 to display in accordance with the received electric signal.

During the implementation, in order to provide the entire electronic device protective case with a beautiful appearance, as shown in FIGS. 5 and 6, the electricity quantity display panel 14 may be arranged at the lower part of the rear shell 2 and kept abreast with the charging/discharging state indicator 12 and the switch assembly 6. Further, as shown in FIGS. 1, 2 and 4, the transparent window 19 in the front cover 1 may also be arranged at a position corresponding to the electricity quantity display panel 14, so that the user can see the electricity quantity display panel 14 without opening the front cover 1. Of course, during the implementation, the electricity quantity display panel 14 may also be arranged at the bottom surface of the rear shell or any other positions, which are not particularly defined herein.

Alternatively, in order to enable the user to acquire time in the case of not opening the front cover or pressing a power button. as shown in FIG. 7, the electronic device protective case may further include a clock control circuit 15 electrically connected to the charging/discharging controller 10, and a time display panel 16 electrically connected to the clock control circuit 15. Further, for the user's convenience, as shown in FIG. 4, usually the time display panel 16 is arranged at an upper part of the front cover 1.

During the implementation, the time display panel 16 is merely required to display the time, with less demands on display accuracy and display colors. Hence, the time display panel 16 may consist of light-emitting diode (LED) digital tubes arranged in an array form.

Alternatively, in order to enable the user to acquire that a call or short message is coming when the electronic device is in a silent or night mode, as shown in FIG. 7, the electronic device protective case may further include a caller ID display control circuit 17 electrically connected to the charging/discharging controller 10, and a caller ID display indicator 18 electrically connected to the caller ID display control circuit 17. In addition, for the user's convenience, as shown in FIG. 4, usually the caller ID display indicator 18 is arranged at the upper part of the front cover 1. When the call or short message is coming, the charging/discharging controller 10 will send an electric signal to the caller ID display control circuit 17, and the caller ID display control circuit 17 will control the caller ID display indicator 18 to flicker.

According to the electronic device protective case of the present disclosure, it is able to, by means of photovoltaic power generation, alleviate the insufficient capacity of the cell for the electronic device when it is used in the open air, and meanwhile the accumulator may be used as a power tank so as to store a certain quantity of electricity for the electronic device. The charging/discharging controller is used to control the photovoltaic cell panel to store electric energy after the photovoltaic conversion in the accumulator, and the electric energy in the accumulator is used to charge the electronic device, so it is able to prevent the occurrence of possible overcharge or backflow in the prior art when the electronic device is directly charged with the photovoltaic cell panel. In addition, it is still able to charge the electronic device even when no sunlight is irradiated on the photovoltaic cell panel, thereby to overcome the limitations in use. In addition, electrical connection states between an external data line port and the electronic device protective case as well as the port of the electronic device are controlled by means of the switch assembly, and when the switch assembly is in the ON state, the charging/discharging controller is used to control the accumulator or the external data line port to charge the electronic device. As a result, it is able to switch charging modes for the electronic device on different occasions, thereby to facilitate the user.

Obviously, a person skilled in the art may make further modifications and variations without departing from the spirit and scope of the present disclosure. If these modifications and variations fall within the scope of the appended claims and the equivalents thereof, the present disclosure also intends to include them.

What is claimed is:

1. An electronic device protective case, comprising a photovoltaic cell panel, an accumulator, a charging/discharging controller, a data port capable of being electrically connected to a port of an electronic device and an external data line port, and a switch assembly capable of controlling electrical connection states of the charging/discharging wherein the photovoltaic cell panel is electrically connected to the accumulator via the charging/discharging controller, and charges the accumulator under the control of the charging/discharging controller by turning the switch assembly on or off, wherein the switch assembly is configured to control, in an OFF state, the charging/discharging controller to be disconnected from the data port and control the external data line port to be directly electrically connected to the data port, and to control, in an ON state, the charging/discharging controller to be electrically connected to the data port and control the external data line port to be electrically connected to the data port via the charging/discharging controller, and wherein the charging/discharging controller is configured to control the accumulator or the external data line port to charge the electronic device, or control the external data line port to charge the accumulator.

2. The electronic device protective case according to claim 1, further comprising a rear shell for accommodating the electronic device and a front cover for covering the electronic device, wherein the photovoltaic cell panel is built in an outer surface of the front cover, and the accumulator is built in the rear shell.

3. The electronic device protective case according to claim 2, wherein the front cover is rotatably mounted, about one of its side edges, on the rear shell.

4. The electronic device protective case according to claim 2, wherein a slot for placing the charging/discharging controller is provided inside the rear shell.

5. The electronic device protective case according to claim 1, further comprising a clock control circuit electrically connected to the charging/discharging controller, and a time display panel electrically connected to the clock control circuit.

6. The electronic device protective case according to claim 2, further comprising a clock control circuit electrically connected to the charging/discharging controller, and a time display panel electrically connected to the clock control circuit.

7. The electronic device protective case according to claim 5, wherein the time display panel consists of light-emitting diode digital tubes arranged in an array form.

8. The electronic device protective case according to claim 1, further comprising a charging/discharging state display circuit electrically connected to the charging/discharging controller, and a charging/discharging state indicator electrically connected to the charging/discharging state display circuit.

9. The electronic device protective case according to claim 2, further comprising a charging/discharging state display circuit electrically connected to the charging/discharging controller, and a charging/discharging state indicator electrically connected to the charging/discharging state display circuit.

10. The electronic device protective case according to claim 8, wherein the charging/discharging state indicator comprises a photovoltaic charge indicator configured to be turned on when the accumulator is being charged with the photovoltaic cell panel, an electronic device charge indicator configured to be turned on when the electronic device is being charged, and a municipal electricity indicator configured to be turned on when the external data line port is operating.

11. The electronic device protective case according to claim 1, further comprising an accumulator electricity quantity display circuit electrically connected to the charging/discharging controller, and an electricity quantity display panel electrically connected to the accumulator electricity quantity display circuit.

12. The electronic device protective case according to claim 2, further comprising an accumulator electricity quantity display circuit electrically connected to the charging/discharging controller, and an electricity quantity display panel electrically connected to the accumulator electricity quantity display circuit.

13. The electronic device protective case according to claim 1 further comprising a caller ID display control circuit electrically connected to the charging/discharging controller and a caller ID display indicator electrically connected to the caller ID display control circuit.

14. The electronic device protective case according to claim 2 further comprising a caller ID display control circuit electrically connected to the charging/discharging controller and a caller ID display indicator electrically connected to the caller ID display control circuit.

15. The electronic device protective case according to claim 3 further comprising a caller ID display control circuit electrically connected to the charging/discharging controller and a caller ID display indicator electrically connected to the caller ID display control circuit.

* * * * *